(12) United States Patent
Yoo et al.

(10) Patent No.: US 11,492,016 B2
(45) Date of Patent: Nov. 8, 2022

(54) AUTONOMOUS DRIVING CONTROL METHOD AND DEVICE

(71) Applicants: HYUNDAI MOTOR COMPANY, Seoul (KR); KIA MOTORS CORPORATION, Seoul (KR)

(72) Inventors: Su Jung Yoo, Seoul (KR); Dong Hwi Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 72 days.

(21) Appl. No.: 17/031,273

(22) Filed: Sep. 24, 2020

(65) Prior Publication Data
US 2021/0380145 A1 Dec. 9, 2021

(30) Foreign Application Priority Data

Jun. 5, 2020 (KR) .................. 10-2020-0068494

(51) Int. Cl.
*B60W 60/00* (2020.01)
*B60W 30/12* (2020.01)
(Continued)

(52) U.S. Cl.
CPC ........ *B60W 60/0059* (2020.02); *B60W 30/12* (2013.01); *B60W 40/072* (2013.01);
(Continued)

(58) Field of Classification Search
CPC ............. B60W 60/0059; B60W 30/12; B60W 40/072; B60W 40/08; B60W 50/14;
(Continued)

(56) References Cited

U.S. PATENT DOCUMENTS

2018/0173225 A1 6/2018 Kim et al.
2018/0329416 A1\* 11/2018 Ichikawa .......... B60W 60/0053
(Continued)

FOREIGN PATENT DOCUMENTS

| DE | 10 2017 003655 A | 10/2017 |
| DE | 10 2018 007508 A | 3/2020 |
| EP | 3552907 A | 10/2019 |

OTHER PUBLICATIONS

European Search Report for European Application No. EP 20 19 8648 dated Mar. 5, 2021 (8 pgs).

*Primary Examiner* — James J Lee
*Assistant Examiner* — Andrew Sang Kim
(74) *Attorney, Agent, or Firm* — Morgan, Lewis & Bockius LLP

(57) ABSTRACT

A method for controlling autonomous driving in an autonomous vehicle includes detecting a situation in which autonomous driving is impossible while the vehicle operates in an autonomous driving mode, outputting a control-right handover request warning alarm and then activating a minimal risk maneuver driving mode, determining a human driver gaze validity based on the detected situation, determining a human driver intervention validity upon determination that the human driver gaze is valid, and determining control-right handover of the autonomous vehicle based on the human driver intervention validity. Thus, the control-right may be reliably transferred from a system to a human driver.

18 Claims, 8 Drawing Sheets

(51) Int. Cl.
  *B60W 40/072*  (2012.01)
  *B60W 40/08*   (2012.01)
  *B60W 50/14*   (2020.01)
  *G06V 20/59*   (2022.01)
  *G06V 40/16*   (2022.01)
(52) U.S. Cl.
  CPC ............ *B60W 40/08* (2013.01); *B60W 50/14* (2013.01); *B60W 60/0018* (2020.02); *B60W 60/0053* (2020.02); *G06V 20/597* (2022.01); *G06V 40/166* (2022.01); *B60W 2040/0809* (2013.01); *B60W 2050/143* (2013.01); *B60W 2520/30* (2013.01); *B60W 2540/225* (2020.02)
(58) Field of Classification Search
  CPC ......... B60W 60/0018; B60W 60/0053; B60W 2040/0809; B60W 2050/143; B60W 2520/30; B60W 2540/225; B60W 2510/202; B60W 2540/10; B60W 2540/12; B60W 2540/18; B60W 2540/215; B60W 2552/30; G06V 20/597; G06V 40/166
  See application file for complete search history.

(56) References Cited

U.S. PATENT DOCUMENTS

| | | | |
|---|---|---|---|
| 2019/0054919 A1* | 2/2019 | Noto | G08G 1/167 |
| 2019/0054928 A1* | 2/2019 | Hatano | G05D 1/0088 |
| 2019/0291747 A1* | 9/2019 | Chiba | G05D 1/0061 |
| 2019/0315376 A1 | 10/2019 | Seo et al. | |
| 2020/0004244 A1* | 1/2020 | Mangal | G05D 1/0088 |
| 2020/0183383 A1* | 6/2020 | Stent | G06F 3/013 |
| 2020/0307642 A1* | 10/2020 | Tsuji | B60W 50/14 |
| 2021/0053587 A1 | 2/2021 | Seo et al. | |

* cited by examiner

| AUTOMATION LEVEL | SAE CLASSIFICATIONS | SYSTEM ROLE | DRIVER ROLE |
|---|---|---|---|
| LEVEL 0 | NO AUTOMATION | TEMPORARY EMERGENCY INTERVENTION OR WARNING ONLY | DRIVER PERFORMS ALL DRIVING |
| LEVEL 1 | DRIVER ASSISTANCE | SYSTEM PERFORMS DRIVING FUNCTIONS, SUCH AS STEERING AND ACCELERATION/DECELERATION UNDER BOARDING OF DRIVER PERFORMING DRIVING FUNCTION IN NORMAL OPERATING MODE | DRIVER DETERMINES WHETHER AND WHEN LEVEL 1 SYSTEM IS ACTIVATED AND PERFORMS ALL DRIVING FUNCTIONS EXCEPT STEERING WHEEL OR ACCELERATION/DECELERATION PEDAL ADJUSTMENT(INCLUDING DRIVING ENVIRONMENT/VEHICLE OPERATION/LEVEL 1 SYSTEM MONITORING AND IMMEDIATE EMERGENCY PREPAREDNESS) |
| LEVEL 2 | PARTIAL AUTOMATION | PERFORMING DRIVING FUNCTIONS SUCH AS STEERING AND ACCELERATION/DECELERATION INSTEAD OF DRIVER, UNDER BOARDING OF DRIVER MONITORING STEERING AND ACCELERATION/DECELERATION DEVICES | DRIVER DETERMINES WHETHER AND WHEN LEVEL 2 SYSTEM IS ACTIVATED AND PERFORMS ALL DRIVING FUNCTIONS EXCEPT STEERING WHEEL OR ACCELERATION/DECELERATION PEDAL ADJUSTMENT(INCLUDING DRIVING ENVIRONMENT/VEHICLE OPERATION/LEVEL 2 SYSTEM MONITORING AND IMMEDIATE EMERGENCY PREPAREDNESS) |
| LEVEL 3 | CONDITIONAL AUTOMATION | IN SITUATIONS BEYOND CONDITION, DRIVING CONTROL IS TRANSFERRED TO DRIVER, AND SYSTEM PERFORMS DRIVING FUNCTIONS SUCH AS STEERING AND ACCELERATION/DECELERATION | DRIVER DETERMINES WHETHER AND WHEN LEVEL 3 SYSTEM IS ACTIVATED AND PERFORMS ALL DRIVING FUNCTIONS EXCEPT STEERING WHEEL OR ACCELERATION/DECELERATION PEDAL ADJUSTMENT OR DRIVING ENVIRONMENT MONITORING (WHEN TRANSFER OF CONTROL RIGHT OF LEVEL 3 SYSTEM IS REQUESTED, DRIVER MUST RECEIVE CONTROL RIGHT AND PERFORM EMERGENCY PREPAREDNESS |
| LEVEL 4 | HIGH AUTOMATION | SYSTEM PERFORMS ALL DRIVING FUNCTIONS UNDER BOARDING OF DRIVER IN EXTREMELY EXCEPTIONAL SITUATIONS | DRIVER OPTIONALLY PERFORMS EMERGENCY PREPAREDNESS WHEN LEVEL 4 SYSTEM REQUEST TRANSFER OF CONTROL RIGHT TO DRIVER |
| LEVEL 5 | FULL AUTOMATION | SYSTEM PERFORMS COMPLETE DRIVING FUNCTION TO RESPOND TO ANY SITUATION WITHOUT DRIVER | DRIVER ONLY MONITORS WHETHER SYSTEM IS WORKING AND DOES NOT PERFORM ALL DRIVING FUNCTIONS |

FIG. 1

AUTONOMOUS DRIVING CONTROL METHOD AND DEVICE

CROSS-REFERENCE TO RELATED APPLICATION

The present application claims priority to and the benefit of Korean Patent Application No. 10-2020-0068494 filed on Jun. 5, 2020, the entire contents of which are incorporated herein by reference.

TECHNICAL FIELD

The present disclosure relates to autonomous vehicle control, and more specifically, to autonomous vehicle control in which a level 3 autonomous vehicle determines human driver gaze validity while performing an autonomous driving function and performs safely control-right handover from a system to a human driver based on the determination result.

BACKGROUND

The statements in this section merely provide background information related to the present disclosure and may not constitute prior art.

The autonomous vehicle requires an ability to adaptively cope with a surrounding situation changing in real time during driving.

For mass production and activation of the autonomous vehicle, a reliable determination control function is required.

A level 2 autonomous driving system as currently produced requires front gaze of a human driver and outputs a predetermined hand-off warning alarm when the human driver does not hold a steering wheel for a certain period of time during autonomous driving.

Therefore, the level 2 autonomous driving system should determine whether the human driver is holding the steering wheel and whether the human driver is in a front gaze state, when the human driver changes an autonomous driving mode to a manual driving mode intentionally.

Further, conventionally, a driving safety system has been provided that determines whether the human driver is drowsy based on eye blinking of the human driver, or measures a fatigue of the human driver based on yawning of the human driver and outputs a warning alarm message that instructs the human driver to stop the vehicle and to rest based on the measured fatigue.

A level 3 autonomous driving system does not necessarily require the human driver to grip the steering wheel while performing the autonomous driving function, and allows the driver to disable the autonomous driving function at a will of the human driver and to activate a manual driving mode.

Thus, the level 3 level autonomous driving system allows hand-off of the human driver. Thus, when switching a driving mode from the autonomous driving mode to the manual driving mode, the system should accurately determine whether the human driver is ready to perform the manual driving.

In the current level 3 autonomous driving system, a situation may arise in which when the autonomous driving mode is deactivated while the human driver is not ready to receive a control-right handover (during the hands-off state of the driver), neither the autonomous driving system nor the human driver controls driving. This increases risk of an accident because the autonomous driving is deactivated when the human driver is not ready to drive.

Currently, a system for determining whether the driver pays attention to a front scene based on the human driver's gaze is already commercialized. However, when the system is applied to the level 3 autonomous vehicle, safety may not be guaranteed.

Therefore, in order to prevent the dangerous situation, the system must be able to accurately determine whether the human driver is ready to receive the control-right handover.

SUMMARY

An aspect of the present disclosure provides an autonomous driving control method and device.

Another aspect of the present disclosure provides an autonomous driving control method and device capable of determining human driver gaze validity when a control-right handover situation occurs during autonomous driving and more safely performing the control-right handover from a system to a human driver based on the determination result.

Another aspect of the present disclosure provides an autonomous driving control method and device capable of determining an optimal driving control scheme based on human driver gaze validity and human driver intervention validity related to each control-right handover event type.

Another aspect of the present disclosure provides an autonomous driving control method and device capable of more accurately and safely determining whether to perform control-right handover and a scheme to perform the handover in a SAE (Society of Automotive Engineers) level 3 autonomous vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for controlling autonomous driving in an autonomous vehicle includes detecting a situation in which autonomous driving is impossible while the vehicle operates in an autonomous driving mode, outputting a control-right handover request warning alarm and then activating a minimal risk maneuver driving mode, determining human driver gaze validity based on the detected situation in which the autonomous driving is impossible, determining human driver intervention validity upon determination that the human driver gaze is valid, and determining control-right handover of the autonomous vehicle based on the determination result about the human driver intervention validity.

In one embodiment, the determining of the human driver gaze validity based on the detected situation in which the autonomous driving is impossible may include performing human driver face recognition using a camera disposed on the vehicle, identifying a human driver gaze point based on the human driver facial recognition result, and calculating a human driver gaze quality value Q based on the human driver gaze point and the detected situation in which the autonomous driving is impossible, wherein the human driver gaze validity is evaluated based on Q.

In one embodiment, when Q is a minimum value, the minimal risk maneuver driving mode may be maintained to perform lane-keeping and deceleration driving, regardless of whether or not the human driver intervention is detected.

In one embodiment, when Q is a maximum value, and the human driver is holding a steering wheel, the outputting of the warning alarm may be deactivated, and a full control-right may be transferred from an autonomous driving system to a human driver to activate a full manual driving mode.

In one embodiment, when Q is the maximum value, and when the human driver is performing front-rear direction movement control while the human driver is not holding the steering wheel, front-rear direction movement control-right may be transferred from the system to the human driver while left-right direction movement control-right belongs to the system.

In one embodiment, when Q is between the minimum value and the maximum value, and when a steering wheel torque exceeds a threshold, a full manual driving mode may be activated, wherein the threshold may be dynamically set to have an inversely proportional relationship to Q.

In one embodiment, when Q is between the minimum value and the maximum value, and when a deceleration resulting from the human driver is greater than a deceleration corresponding to the minimal risk maneuver driving mode while the human driver is not holding the steering wheel, front-rear direction movement control-right may be transferred from the system to the human driver while left-right direction movement control-right belongs to the system.

In one embodiment, when Q is between the minimum value and the maximum value, and when the deceleration resulting from the human driver is lower than or equal to the deceleration corresponding to the minimal risk maneuver driving mode while the human driver is not holding the steering wheel, the minimal risk maneuver driving mode may be maintained to perform lane-keeping and deceleration driving.

In one embodiment, the detected situation in which the autonomous driving is impossible may be an expected transition demand (TD) event including a section termination event and a curved road section drive event, wherein when the human driver is in a front gaze state at the section termination event, or when a human driver gaze direction is valid for a curved road section in the curved road section drive event, Q may be determined as a maximum value, wherein when the human driver is not in a front gaze state at the section termination event, or when a human driver gaze direction is invalid for a curved road section in the curved road section drive event, Q may be determined as a minimum value.

In one embodiment, the detected situation in which the autonomous driving is impossible may be an unexpected TD event, wherein Q may be determined based on a distance between a point that has caused the unexpected TD situation and the human driver gaze point.

According to an aspect of the present disclosure, a device for controlling autonomous driving includes a recognizer for detecting a situation in which autonomous driving is impossible while the vehicle operates in an autonomous driving mode, a controller for outputting a control-right handover request warning alarm and then activating a minimal risk maneuver driving mode upon detection of the situation in which autonomous driving is impossible, a human driver gaze validity determiner for determining human driver gaze validity based on the detected situation in which the autonomous driving is impossible, a human driver intervention validity determiner for determining human driver intervention validity upon determination that the human driver gaze is valid, and a control-right handover determiner for determining control-right handover based on the determination result about the human driver intervention validity.

In one embodiment, the device may further include a human driver face recognition system for performing human driver face recognition in association with an indoor camera, wherein the human driver gaze validity determiner may identify a human driver gaze point based on the human driver facial recognition result, calculate a human driver gaze quality value Q based on the human driver gaze point and the detected situation in which the autonomous driving is impossible, and evaluate the human driver gaze validity based on Q.

In one embodiment, when Q is a minimum value, the control-right handover determiner may determine to maintain the minimal risk maneuver driving mode to perform lane-keeping and deceleration driving, regardless of whether or not the human driver intervention is detected.

In one embodiment, when Q is a maximum value, and the human driver is holding a steering wheel, the control-right handover determiner may determine to deactivate the outputting of the warning alarm, and then transfer a full control-right from an autonomous driving system to the human driver to activate a full manual driving mode.

In one embodiment, when Q is the maximum value, and when the human driver is performing front-rear direction movement control while the human driver is not holding the steering wheel, the control-right handover determiner may determine to transfer front-rear direction movement control-right from an autonomous driving system to the human driver while left-right direction movement control-right belongs to the system.

In one embodiment, when Q is between the minimum value and the maximum value, and when a steering wheel torque exceeds a threshold, the control-right handover determiner may determine to activate a full manual driving mode, wherein the threshold may be dynamically set to have an inversely proportional relationship to Q.

In one embodiment, when Q is between the minimum value and the maximum value, and when a deceleration resulting from the human driver is greater than a deceleration corresponding to the minimal risk maneuver driving mode while the human driver is not holding the steering wheel, the control-right handover determiner may determine to transfer front-rear direction movement control-right from an autonomous driving system to the human driver while left-right direction movement control-right belongs to the system.

In one embodiment, when Q is between the minimum value and the maximum value, and when the deceleration resulting from the human driver is lower than or equal to the deceleration corresponding to the minimal risk maneuver driving mode while the human driver is not holding the steering wheel, the control-right handover determiner may determine to maintain the minimal risk maneuver driving mode to perform lane-keeping and deceleration driving.

In one embodiment, the detected situation in which the autonomous driving is impossible may be an expected transition demand (TD) event including a section termination event and a curved road section drive event, wherein when the human driver is in a front gaze state at the section termination event, or when a human driver gaze direction is valid for a curved road section in the curved road section drive event, Q may be determined as a maximum value, wherein when the human driver is not in a front gaze state at the section termination event, or when a human driver gaze direction is invalid for a curved road section in the curved road section drive event, Q may be determined as a minimum value.

In one embodiment, the detected situation in which the autonomous driving is impossible may be an unexpected TD event, wherein Q may be determined based on a distance between a point that has caused the unexpected TD situation and the human driver gaze point.

DRAWINGS

The above features and advantages of the present disclosure will be more apparent from the following detailed description taken in conjunction with the accompanying drawings:

FIG. 1 is a table in which an automation level of an autonomous vehicle in one form of the present disclosure;

DETAILED DESCRIPTION

Figure 2:
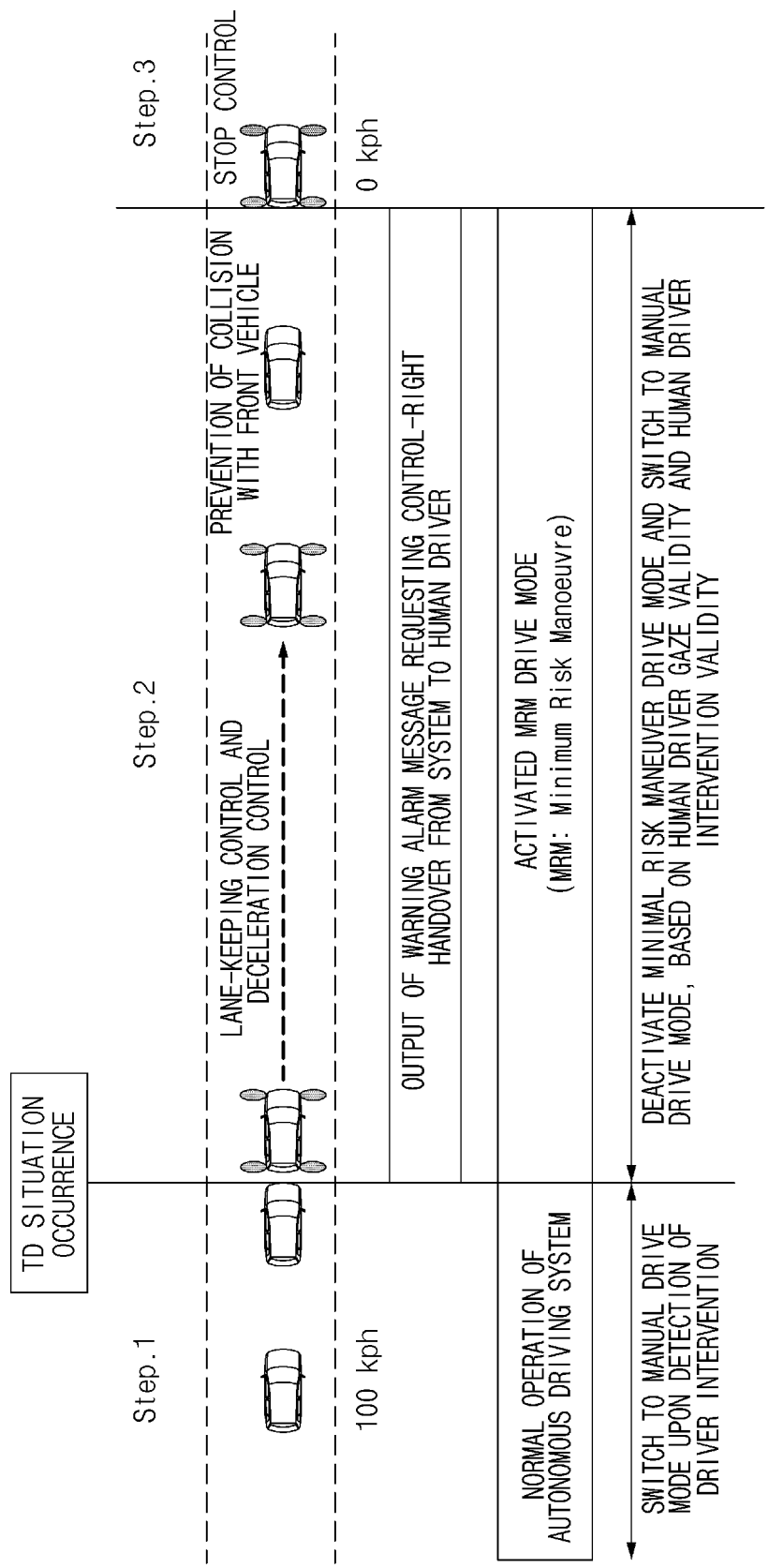
FIG. 2 is a view for illustrating an autonomous vehicle control procedure according to TD situation occurrence during autonomous driving.

Hereinafter, some embodiments of the present disclosure will be described in detail with reference to the exemplary drawings. It should be noted that in adding reference numerals to components of the drawings, the same or equivalent components are designated by the same numeral even when they are present on different drawings. Further, in describing an embodiment of the present disclosure, a detailed description of a related known component or function will be omitted when it is determined that the description interferes with understanding of the embodiment of the present disclosure.

In describing components of an embodiment according to the present disclosure, terms such as first, second, A, B, (a), (b), and the like may be used. These terms are merely intended to distinguish between the components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIG. 1 to FIG. 8.

FIG. 1 is a table in which an automation level of an autonomous vehicle according to one embodiment of the present disclosure is defined.

An autonomous vehicle means a vehicle driving by itself while determining a danger by recognizing a driving environment of the vehicle and thus controlling a driving route in order to avoid the danger, thereby minimizing driving manipulation of the human driver.

Ultimately, an autonomous vehicle means a vehicle capable of driving, steering, and parking without human influence. Autonomous driving as a core technique of the autonomous vehicle refers to an ability to drive the vehicle without active control or monitoring of the human driver. The ability is currently increasingly advanced.

However, a concept of a current autonomous vehicle may include a middle automation level, as shown in FIG. 1 which advances to a full-autonomous level and may correspond to a goal-oriented concept targeting mass production and commercialization of a fully autonomous vehicle.

The autonomous driving control method according to the present disclosure may be applied to an autonomous vehicle corresponding to a level 3 (conditional autonomous driving) among automation levels of an autonomous driving system shown in FIG. 1, but may not be limited thereto and may also be applied to other levels of autonomous vehicles where a control-right handover situation may occur.

The automation levels of the autonomous vehicle based on SAE (Society of Automotive Engineers may be classified as shown in the table of FIG. 1.

FIG. 2 is a view for illustrating an autonomous vehicle control procedure according to TD situation occurrence during autonomous driving.

Hereinafter, for convenience of description, the autonomous vehicle will be simply referred to as "vehicle".

Referring to FIG. 2, when an autonomous driving function is activated according to input of an autonomous driving selection button by a human driver, the vehicle may operate in an autonomous driving mode.

The vehicle may determine whether human driver intervention occurs, in consideration of a steering wheel torque value and a steering wheel torque holding time, an accelerator/brake acceleration/deceleration control amount, an autonomous driving deactivation button input, and the like in an autonomous driving normal operation state.

When the human driver intervention is detected in the autonomous driving normal operation state, the vehicle may switch the autonomous driving mode to a manual driving mode immediately.

When, during autonomous driving, a TD (Transition Demand) situation occurs due to system failure, collision risk detection, etc., the vehicle may output a warning alarm message requesting control-right handover from the system to the human driver, and may operate in a minimal risk maneuver driving mode.

In this connection, the TD situation means a situation in which autonomous driving is no longer maintained, and may include situations such as interrupting by other vehicles, appearance of front pedestrians or wild animals, detection of front obstacles, sudden stop of front vehicles, deterioration of weather, etc. and is not limited thereto. System failures such as vehicle controller failure, vehicle communication failure, and fuel shortage and failure situations may be included therein.

Further, the TD situation may include an expected event that the autonomous vehicle may expect as well as the above unexpected event. In one example, the expected event may include a toll gate entry event, a highway section termination event, etc. and is not limited thereto.

When the vehicle operates in the minimal risk maneuver driving mode, the vehicle may perform lane-keeping and deceleration control until the vehicle is completely stopped.

The vehicle may determine validity of the human driver gaze in the minimal risk maneuver driving mode, and may determine validity of human driver intervention, based on acceleration and deceleration according to accelerator/brake manipulation, whether the steering wheel is gripped by the driver, the steering wheel torque value, and the steering wheel torque holding time.

The vehicle may determine the human driver gaze validity and human driver intervention validity in the minimal risk maneuver driving mode and deactivate the minimal risk maneuver driving mode and switch to the manual driving mode, based on the determination result.

When the control-right handover from the system to the human driver is completed normally, the vehicle may stop outputting the warning alarm message requesting the control-right handover from the system to the human driver.

Figure 3:
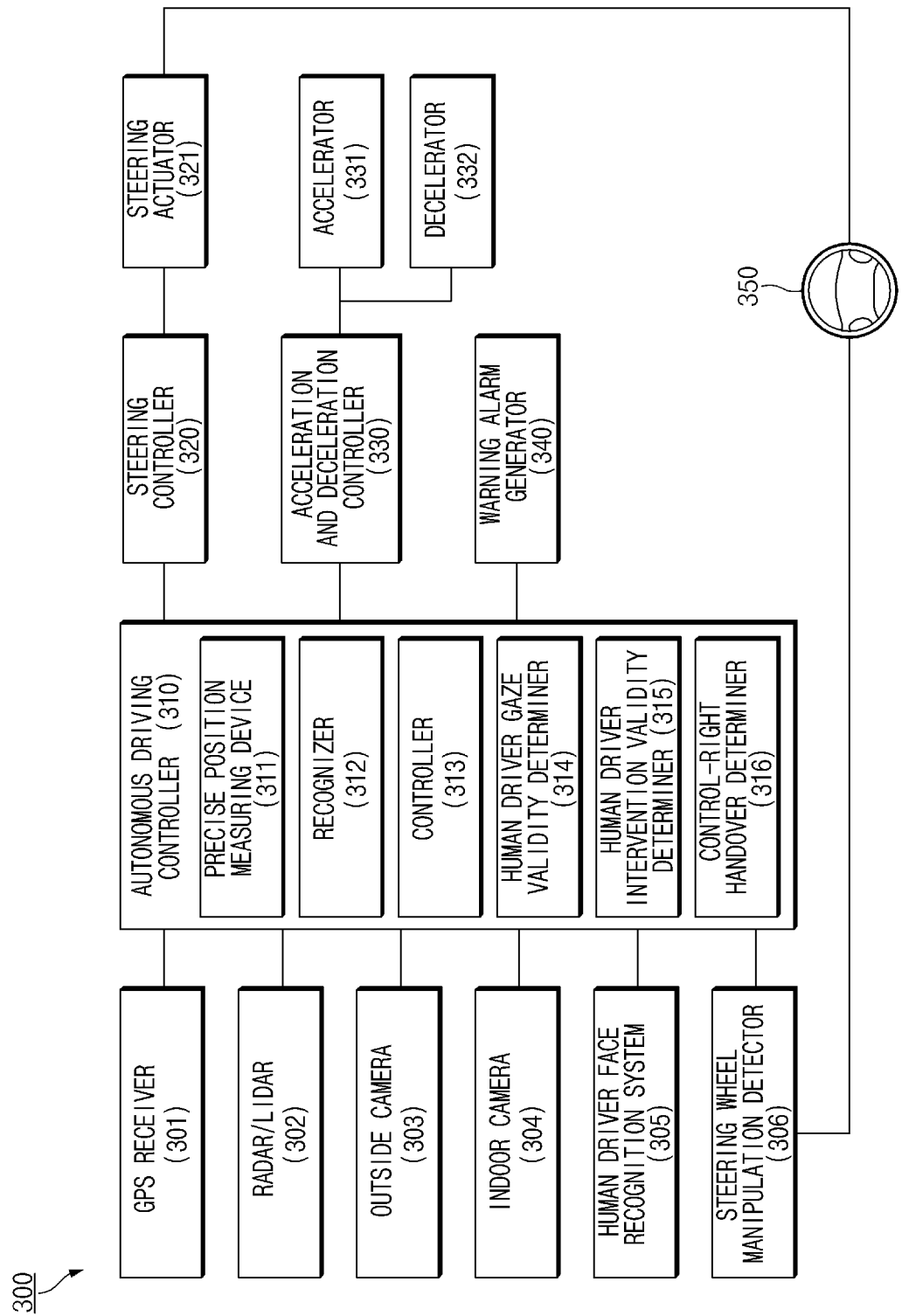
FIG. 3 is a block diagram for illustrating a structure of an autonomous driving control device in one form of the present disclosure.

FIG. 3 is a block diagram for illustrating a structure of an autonomous driving control device according to one embodiment of the present disclosure.

Referring to FIG. 3, an autonomous driving control device 300 may include a GPS receiver 301, a radar/lidar 302, an outside camera 303, an indoor camera 304, a human driver face recognition system 305, a steering wheel manipulation detector 306, an autonomous driving controller 310, a steering controller 320, a steering actuator 321, an acceleration and deceleration controller 330, an accelerator 331, a decelerator 332, a warning alarm generator 340 and a steering wheel 350.

The autonomous driving controller 310 may be configured to include a precise position measuring device 311, a recognizer 312, a controller 313, a human driver gaze validity determiner 314, a human driver intervention validity determiner 315 and a control-right handover determiner 316.

All of the components of the autonomous driving control device 300 shown in FIG. 3 may not necessarily be essential components, and thus more or fewer components may be included therein.

The GPS receiver 301 may receive a position signal from a position measuring satellite. In this connection, the position signal may be used to create geographical location information about the vehicle.

The radar/lidar 302 may detect objects around the vehicle. The radar/lidar 302 may detect objects in front, side and rear of the vehicle, and may calculate a distance to the detected object, and may distinguish whether the detected object is a static object or a dynamic object, and may measure a moving speed of the detected dynamic object, and may distinguish whether the detected dynamic object is a pedestrian or a vehicle, and may identify a condition of a road and facilities via a high resolution terrain scan.

The outside camera 303 may be mounted on an outside of the vehicle to photograph front, side, and rear images of the vehicle. To this end, a plurality of outside cameras 303 may be provided on the vehicle.

The image captured by the outside camera 303 may be used for purposes such as line identification, object identification around the vehicle, and augmented reality.

The indoor camera 304 may be mounted on an inner side of the vehicle to take a picture of the human driver. In one example, the indoor camera 304 may recognize the human driver's face and image the human driver's face. In an embodiment, the indoor camera 304 may include a thermal infrared-based facial recognition camera to capture a thermal image, but is not limited thereto. The indoor camera 304 may include both a visible light camera and a thermal infrared camera to image visible and infrared images.

The image captured by the indoor camera 304 may be used for the purpose of analyzing and monitoring a gaze direction and a gaze point of the human driver, whether or not the human driver is drowsy, and a fatigue of the human driver.

The human driver face recognition system 305 may analyze the image taken by the indoor camera 304 according to a control signal from the autonomous driving controller 310 to recognize the face of the human driver, and determine the gaze direction of the human driver and the gaze point of the human driver, based on the recognized face.

According to an embodiment, the autonomous driving controller 310 may activate the indoor camera 304 when the TD situation occurs, and may control the human driver face recognition system 305 to perform the human driver face recognition. However, this is only one example. When the vehicle operates in the autonomous driving mode, the indoor camera 304 may be automatically activated, and the human driver face recognition system 305 may automatically perform the human driver face recognition.

In one example, the TD situation may include pedestrian or wildlife appearance in front of the vehicle, front obstacle detection, vehicle cut-in, vehicle controller/actuator failure, external and internal camera system failure, vehicle internal/external communication failure, etc.

The steering wheel manipulation detector 306 may detect a gripping state and a manipulation state of the steering wheel 350 by the human driver. In one example, the steering wheel manipulation detector 306 may measure the steering wheel torque according to the control signal from the autonomous driving controller 310 when the TD situation occurs.

In one example, the steering wheel 350 is equipped with a sensor capable of detecting whether or not the steering wheel is gripped by the human driver, for example, at least one of a touch sensor, a pressure sensor, or a biological sensor. In this case, the steering wheel manipulation detector 306 may determine whether the steering wheel 350 is gripped by the human driver based on sensing information collected from the at least one sensor.

In another example, the steering wheel manipulation detector 306 may measure a torque amount and a torque change of the steering wheel 350 in conjunction with the steering controller 320 and/or the steering actuator 321. When the torque amount or the torque change of the steering wheel 350 above or equal to a predetermined reference value is sensed, the autonomous driving controller 310 may determine that the human driver has intervened in a left-right direction steering.

Hereinafter, a detailed structure of the autonomous driving controller 310 will be described in detail.

The precise position measuring device 311 may determine a current position of the vehicle using the position signal from the GPS receiver 301 and pre-stored precise map information, and may map the determined current position of the vehicle on a precise map.

The recognizer 312 may recognize a line based on sensing information from the radar/lidar 302 and image information imaged by the outside camera 303, and may recognize a vehicle driving environment such as another vehicle driving around the vehicle, an obstacle surrounding the vehicle, and a pedestrian around the vehicle.

Further, the recognizer 312 may identify whether the vehicle is driving along a straight line or a curved line based on the precise map information corresponding to the current position of the vehicle.

Further, the recognizer 312 may recognize a speed limit, a gradient, and a curvature of a road on which the vehicle is driving, based on at least one of the precise map mapping information, the sensing information received from the radar/lidar 302, and the image information imaged by the outside camera 303.

The controller 313 may calculate a request command value based on the recognition result of the recognizer 312, and may transmit a control command signal including the calculated request command value to the steering controller 320 and/or the acceleration and deceleration controller 330.

Further, the controller 313 may monitor failures of various system/controller/actuator provided for autonomous driving.

In one example, the failure monitoring may include monitoring of failures of an outdoor/indoor camera system, a positioning system including the GPS receiver 301, a lidar/radar 302 system, a braking system, a driving system, a transmission system, a communication system, and the like.

The controller 313 may determine whether the TD situation has occurred based on the recognition result of the recognizer 312 and/or the failure monitoring result.

The controller 313 may be configured to control the warning alarm generator 340 to output a predetermined warning alarm message requesting the control-right handover from the system to the human driver when the TD situation occurs.

When the TD situation occurs, the controller 313 may allow the vehicle to operate in the minimal risk maneuver driving mode and perform lane-keeping and deceleration control.

When the TD situation occurs, the human driver gaze validity determiner 314 may calculate a human driver gaze quality value and determine the human driver gaze validity based on the quality value.

A human driver gaze quality value calculation method based on a TD situation type by the human driver gaze validity determiner 314 will be clearer based on descriptions of the drawings to be described later.

When the TD situation occurs, the human driver intervention validity determiner 315 may identify the human driver intervention and may determine validity of the identified human driver intervention.

The control-right handover determiner 316 may adaptively perform a control-right handover control method based on the human driver gaze validity determination result and the human driver intervention validity evaluation result.

In one example, the control-right handover control scheme may include a scheme of maintaining the minimal risk maneuver driving mode, a scheme of switching to a full manual mode, a scheme of switching to a partial manual mode, and the like.

The steering controller 320 may be in charge of a left-right direction movement of the autonomous vehicle. The steering controller 320 may control a steering direction and a torque of the steering actuator 321 according to a left-right direction movement control request command value transmitted from the controller 313 of the autonomous driving controller 310.

The acceleration and deceleration controller 330 may be in charge of a front-rear direction movement of the autonomous vehicle.

The acceleration and deceleration controller 330 may control the accelerator 331 and/or the decelerator 332 based on a front-rear direction movement control request command value transmitted from the controller 313 of the autonomous driving controller 310. In one example, the accelerator 331 may include a throttle that controls an amount of air supplied to an engine, an accelerator that controls an amount of fuel supplied to the engine, and the like. The decelerator 332 may include a brake to reduce a speed of the vehicle.

Figure 4:
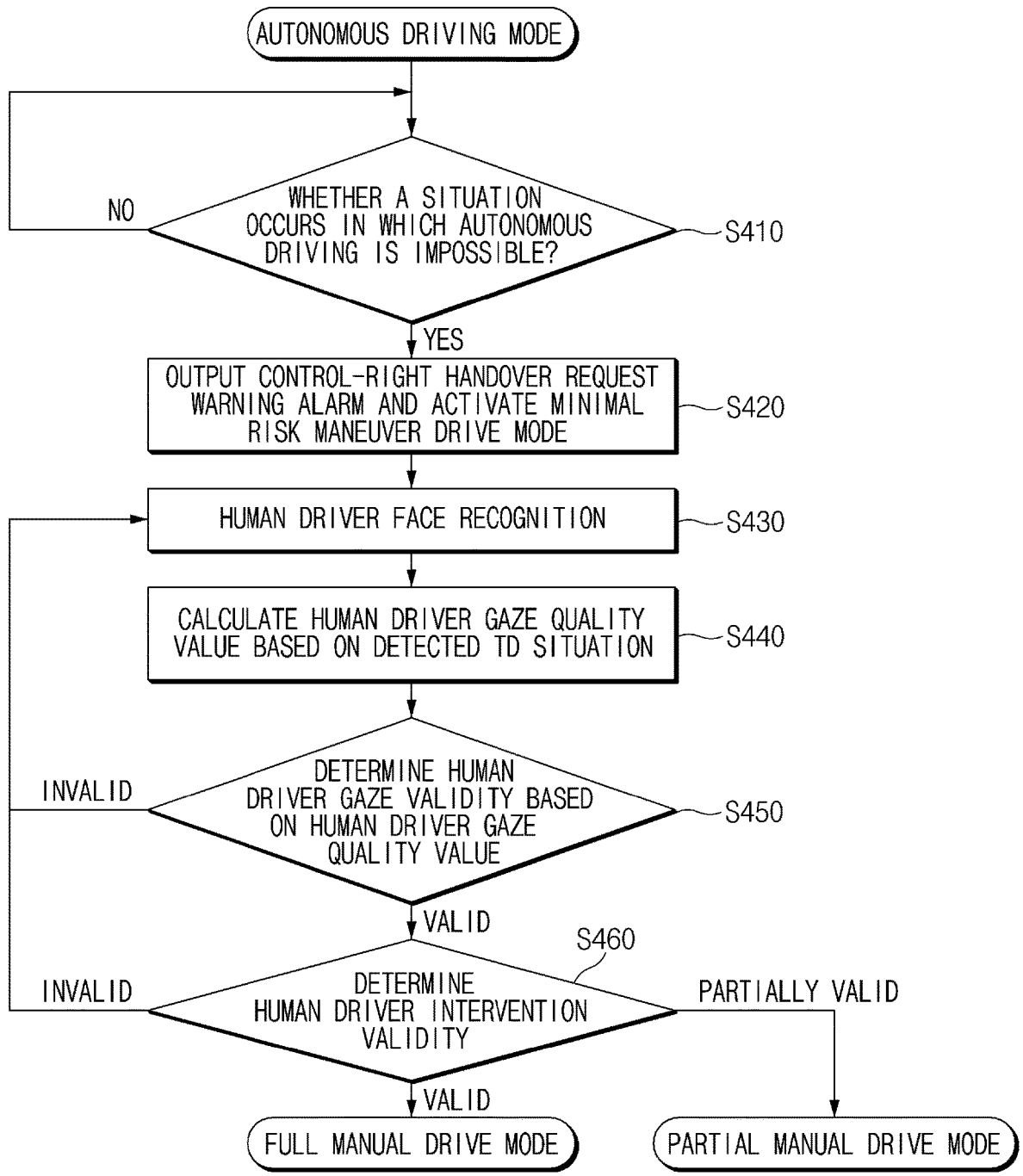
FIG. 4 is a flowchart for illustrating an autonomous driving control method in an autonomous driving control device in one form of the present disclosure.

FIG. 4 is a flowchart for illustrating an autonomous driving control method in an autonomous driving control device according to one embodiment of the present disclosure.

Hereinafter, for convenience of description, the autonomous driving control device 300 of the FIG. 3 will be simply referred to as "device 300".

Referring to FIG. 4, when a situation occurs in which autonomous driving is impossible while the vehicle is operating in an autonomous driving mode, that is, when the TD situation is detected, the device 300 may output the control-right handover request warning alarm and then activate the minimal risk maneuver driving mode (S410 to S420).

The device 300 may identify the gaze direction and the gaze point of the human driver via the human driver face recognition when the minimal risk maneuver driving mode is activated (S430).

The device 300 may calculate the human driver gaze quality value based on the detected TD situation (S440).

The device 300 may determine the human driver gaze validity based on the human driver gaze quality value (S450).

When, based on the determination result, the human driver gaze is valid for the detected TD situation, the device 300 may determine the human driver intervention validity (S460).

In this connection, the human driver intervention validity may include one of "invalid", "partially valid", and "valid".

When, based on the determination result in step 460, the human driver intervention is valid, the device 300 may activate a full manual driving mode, and may transfer a full control-right from the system to the human driver.

When, based on the determination result in step 460, the human driver intervention is partially valid, the device 300 may activate a partial manual driving mode, and thus may transfer a control-right of the front-rear direction movement to the human driver and allow a control-right of the left-right direction movement to belong to the system.

When the human driver gaze is determined to be invalid for the detected TD situation in step 450, or when the human driver intervention is determined to be invalid in step 460, the vehicle may proceed to step 430, and may perform the human driver face recognition while performing the lane-keeping and deceleration control in the minimal risk maneuver driving mode.

Figure 5:
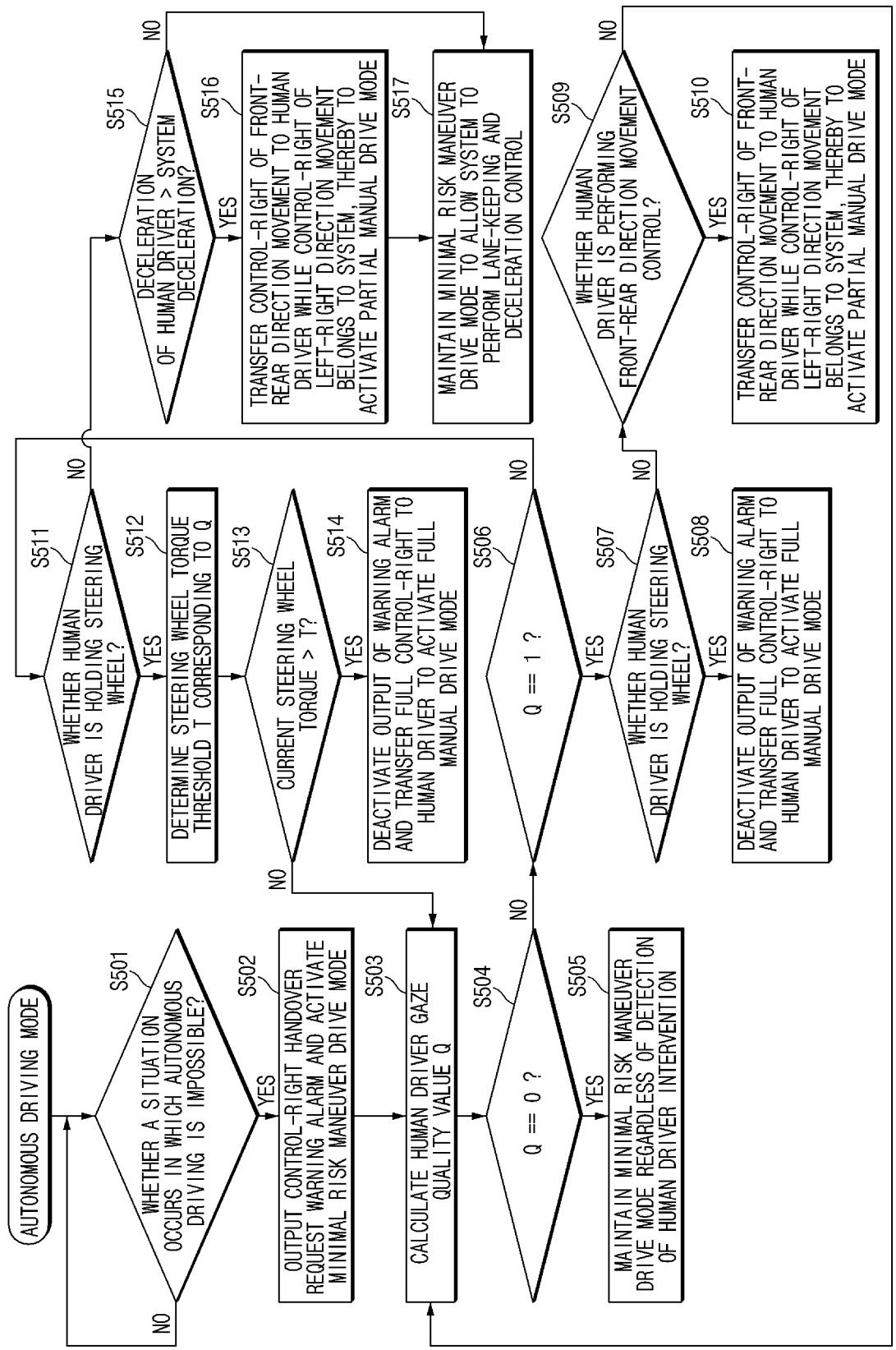
FIG. 5 is a flowchart for illustrating an autonomous driving control method in an autonomous driving control device in one form of the present disclosure.

FIG. 5 is a flowchart for illustrating the autonomous driving control method in an autonomous driving control device according to another embodiment of the present disclosure.

Hereinafter, for convenience of description, the autonomous driving control device 300 of FIG. 3 will be simply referred to as "device 300".

Referring to FIG. 5, when a situation occurs in which autonomous driving is impossible while the vehicle is operating in an autonomous driving mode, that is, when the TD situation is detected, the device 300 may output the control-right handover request warning alarm and then activate the minimal risk maneuver driving mode (S501 to S502).

The device 300 may calculate the human driver gaze quality value Q (S503). In this connection, Q may have a value of 0 to 1.

The device 300 may determine whether Q is 0 (S504).

When, based on the determination result, Q is 0, the device 300 may maintain the minimal risk maneuver driving mode to perform lane-keeping and deceleration control regardless of the human driver intervention (S505).

When, based on the determination result in step 504, Q is not 0, the device 300 may determine whether Q is 1 (S506).

When, based on the determination result, Q is 1, the device 300 may determine whether the human driver is holding the steering wheel (S507).

When it is determined that the human driver is holding the steering wheel, the device 300 may deactivate the output of the warning alarm and then may transfer the full control-right to the human driver to activate the full manual driving mode.

When it is determined in step 507 that the human driver is not holding the steering wheel, the device 300 may determine whether the human driver is performing front-rear direction movement control (S509).

When it is determined that the human driver is performing the front-rear direction movement control, the device 300 may allow the control-right of the left-right direction movement to belong to the system and may transfer the control-right of the front-rear direction movement to the human driver to activate the partial manual driving mode (S510).

When it is determined in step 509 that the human driver is not performing the front-rear direction movement control, the device 300 may process to step 503.

When, in step 506, Q is not 1, that is, when Q is a value between 0 and 1, the device 300 may determine whether the human driver is holding the steering wheel (S511).

When, based on the determination result, the human driver is holding the steering wheel, the device 300 may determine a steering wheel torque threshold T corresponding to Q (S512). In one example, the larger Q, the smaller T. That is, T may be inversely proportional to Q.

The device 300 may determine whether a current steering wheel torque is greater than T (S513).

When, based on the determination result, the current steering wheel torque is greater than T, the device 300 may deactivate the output of the warning alarm and may transfer the full control-right to the human driver to activate the full manual driving mode (S514).

When, in step 511, the human driver is not holding the steering wheel, the device 300 may determine whether a deceleration of the human driver is greater than the system deceleration (S515).

In this connection, the deceleration of the human driver means a deceleration generated when the human driver steps on the brake pedal. The system deceleration may mean a deceleration generated in the deceleration control by the system in the minimal risk maneuver driving mode.

When it is determined that the deceleration of the human driver is greater than the system deceleration, the device 300 may allow the control-right of the left-right direction movement to belong to the system and may transfer the control-right of the front-rear direction movement to the human driver to activate the partial manual driving mode (S516).

When it is determined that the deceleration of the human driver is lower than or equal to the system deceleration, the device 300 may maintain the minimal risk maneuver driving mode to allow the system to perform lane-keeping and deceleration control (S517).

Figure 6:
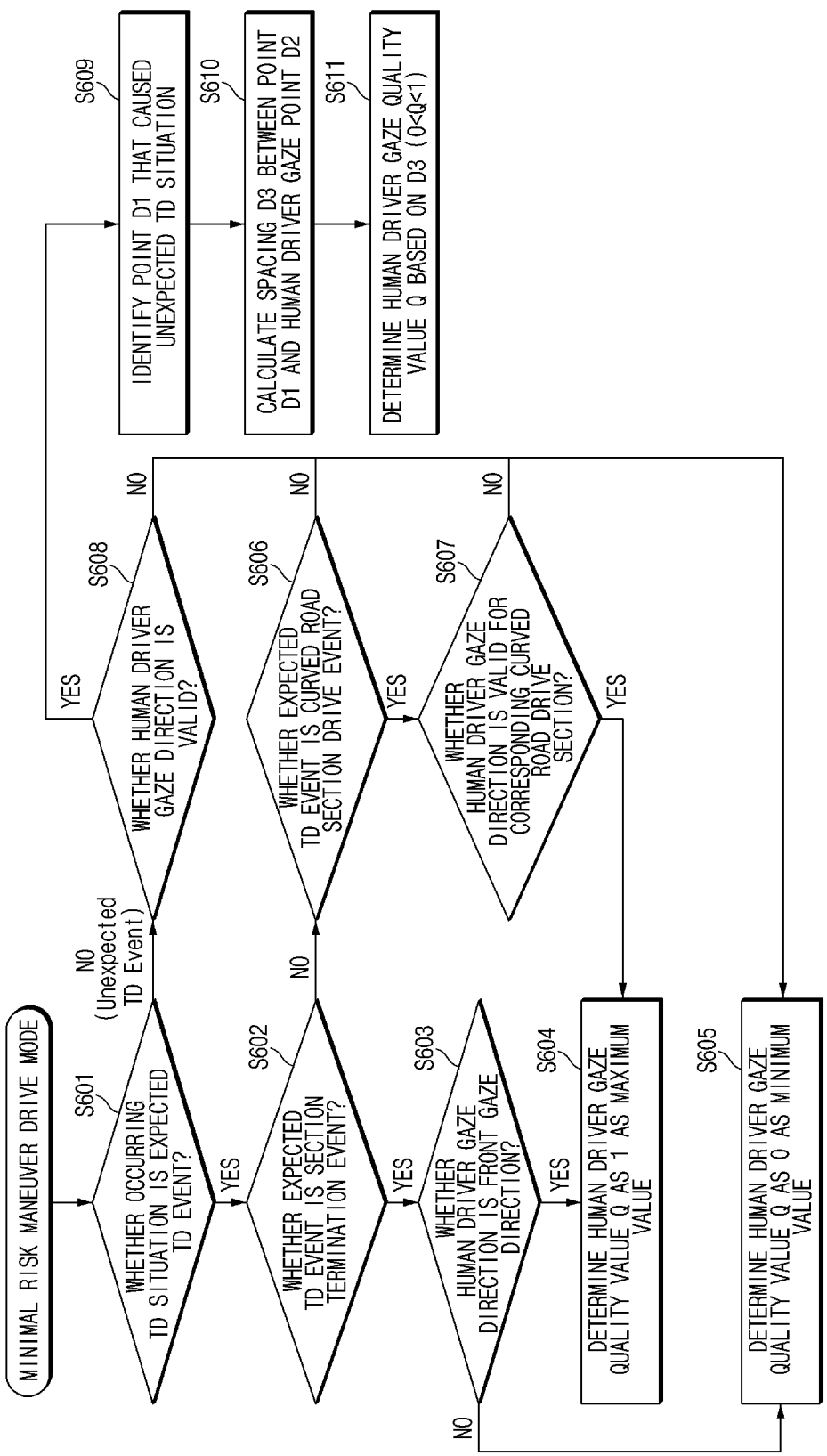
FIG. 6 is a flowchart for illustrating an autonomous driving control method in an autonomous driving control device in one form of the present disclosure.

FIG. 6 is a flowchart for illustrating an autonomous driving control method in an autonomous driving control device according to another embodiment of the present disclosure.

Specifically, FIG. 6 is a flowchart to illustrate a method for calculating the human driver gaze quality value Q by the autonomous driving control device when the vehicle operates in the minimal risk maneuver driving mode in response to the TD situation occurrence.

Hereinafter, for convenience of description, the autonomous driving control device 300 of FIG. 3 will be simply referred to as "device 300".

Referring to FIG. 6, when the device 300 activates the minimal risk maneuver driving mode, the device 300 may determine whether the occurring TD situation is the expected TD event (S601).

When, based on the determination result, the occurring TD situation is the expected TD event, the device 300 may determine whether the expected TD event is a section termination event (S602). In this connection, the section termination event may include a toll gate entry event, a highway termination event, and the like.

When, based on the determination result, the expected TD event is the section termination event, the device 300 may determine whether the human driver gaze direction is a front gaze direction (603).

When, based on the determination result, the human driver gaze direction is the front gaze direction, the device 300 may determine the human driver gaze quality value Q as 1 as a maximum value (S604).

When, based on the determination result in step 603, the human driver gaze direction is not the front gaze direction, the device 300 may determine the human driver gaze quality value Q as 0 as a minimum value (S605).

When the expected TD event is not the section termination event in step 602, the device 300 may determine whether the expected TD event is a curved road section drive event (S606).

When, based on the determination result, the expected TD event is the curved road section drive event, the device 300 may determine the human driver gaze validity (S607). In one example, the device 300 may determine whether the human driver gaze direction and point are valid for the corresponding curved road drive section.

When, based on the determination result, the human driver gaze direction is valid for the corresponding curved road drive section, the device 300 may determine human driver gaze quality value Q as 1 as the maximum value. When, based on the determination result, the human driver gaze direction is invalid for the corresponding curved road drive section, the device 300 may determine human driver gaze quality value Q as the minimum value of 0.

When, in step 601, the occurring TD situation is not the expected TD event, but is an unexpected TD situation, the device 300 may determine whether the human driver gaze direction is valid (S608). In one example, when the gaze direction of the human driver is toward a top of a windshield or a bottom of the windshield, the device 300 may determine that the human driver gaze direction is not valid. In another example, when the human driver has eyes closed or the fatigue of the human driver is greater than or equal to the reference value, the device 300 may determine that the human driver gaze direction is not valid.

When, based on the determination result, the human driver gaze direction is not valid, the device 300 may determine the human driver gaze quality value Q as a minimum value of 0.

When, based on the determination result in step 608, the human driver gaze direction is valid, the device 300 may identify a point d1 that caused the unexpected TD situation (S609).

The device 300 may calculate a spacing d3 between the point d1 and a human driver gaze point d2. The device 300 may determine the human driver gaze quality value Q based on d3 (S611) In this connection, Q determined based on d3 may have a value between 0 and 1. In one example, the smaller d3, the larger Q. That is, Q may be inversely proportional to d3.

Figure 7:
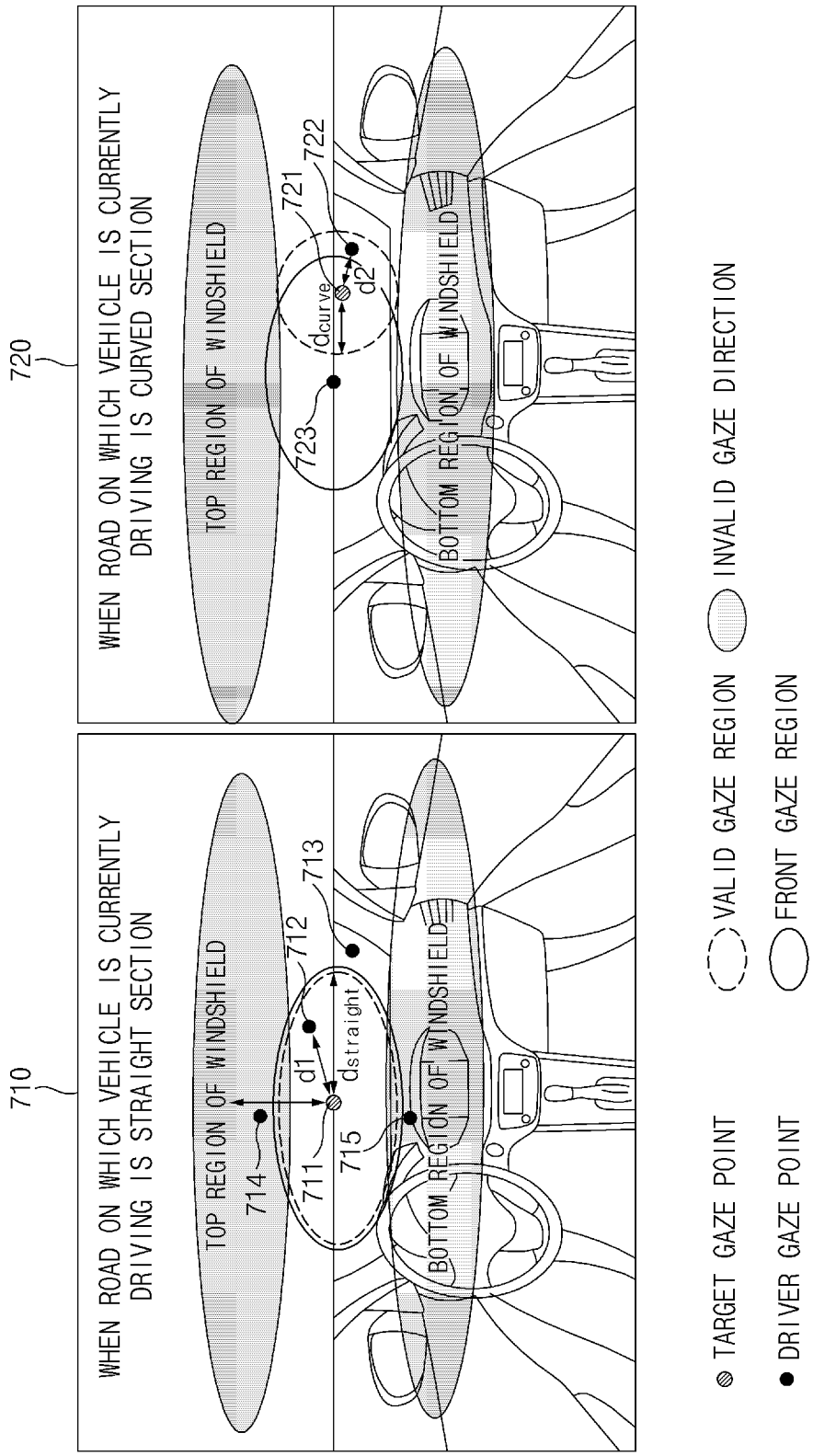
FIG. 7 is a diagram for illustrating a method of determining human driver gaze validity when an expected TD event occurs in one form of the present disclosure.

FIG. 7 is a diagram for illustrating a human driver gaze validity evaluation method in the expected TD situation according to the embodiment.

Referring to FIG. 7, a reference numeral 710 shows how to evaluate the human driver gaze validity when a road on which the vehicle is currently driving is a straight section. A reference numeral 720 shows how to evaluate the human driver gaze validity when a road on which the vehicle is currently driving is a curved road section.

Referring to the reference numeral 710, when the vehicle is driving along a straight section, the device 300 may determine a front gaze region as a valid gaze region, and may determine a target gaze point as a center of the valid gaze region. In one example, the front gaze region may be defined to have an oval shape. This is only one example. In another example, the front gaze region may be defined to have a rectangle or other shape.

In one example, when the human driver gaze point is located in the valid gaze region, the device 300 may determine that the human driver gaze is valid. In another example, the device 300 may determine a gaze point of the human driver, and may calculate a spacing d between the target gaze point and the human driver's gaze point.

The device 300 may compare the calculated spacing d1 and a first reference value $d_{straight}$ and determine the human driver gaze validity based on the comparison result. In one example, when d1 is smaller than the first reference value, the device 300 may determine that the human driver gaze is valid. When d1 is smaller than the first reference value, but the human driver gaze point is located in a top region of the windshield or a bottom region of the windshield, the device 300 may determine that the human driver's gaze is invalid.

A reference numeral 712 is directed to a case where the human driver gaze point is located within the valid gaze region, and is valid. The reference numeral 713 is directed to a case where the human driver gaze point is not valid because the point is located outside the valid gaze region. The reference numerals 714 and 715 show that d1 is smaller than the first reference value, but the human driver gaze point is located in the top region of the windshield and the bottom region of the windshield, respectively, and is not valid.

Referring to the reference numeral 720, when the vehicle is driving along a curved road section, the device 300 may determine not the front gaze region but a region adjacent thereto in a direction corresponding to the curve direction as a valid gaze region and may determine the target gaze point as a center of the determined valid gaze region. In one example, the valid gaze region for the curved road section may be defined to have a circle shape. This is only one example. The valid gaze region for the curved road section may be defined to have a square shape.

When a spacing d2 between a target gaze point 721 and a human driver gaze point 722 is within a radius $d_{curve}$ of the valid gaze region, the device 300 may determine that the human driver's gaze is valid.

Figure 8:
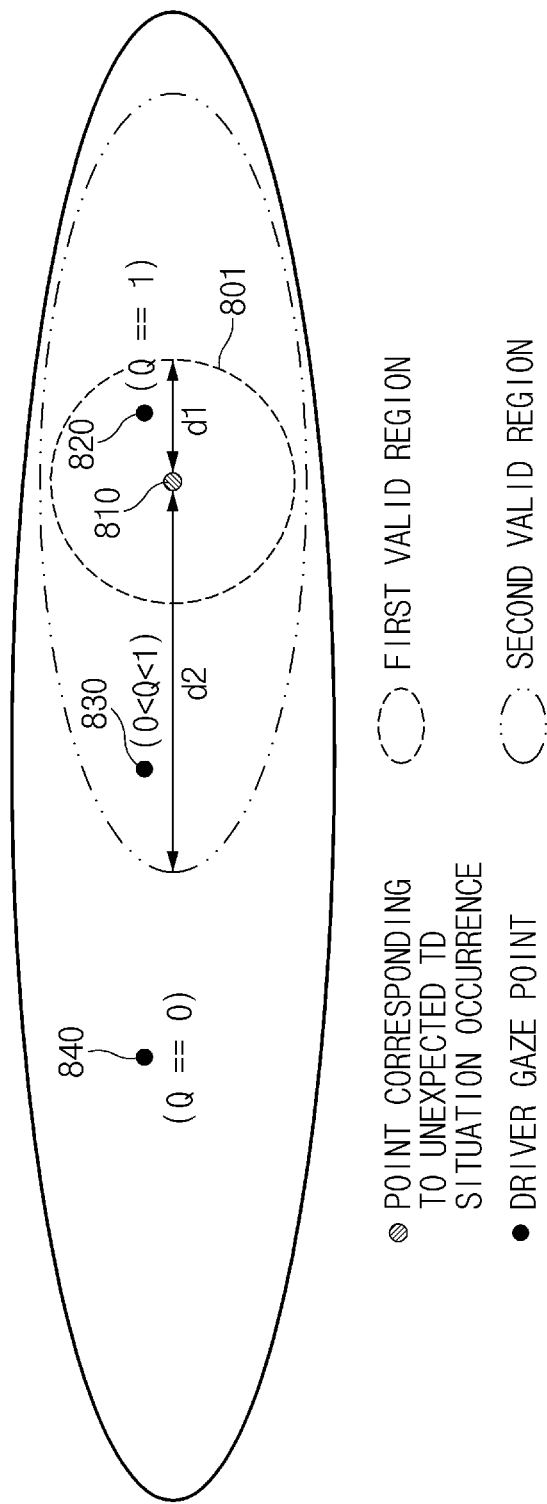
FIG. 8 is a diagram illustrating a method of determining human driver gaze validity when an unexpected TD event occurs according to an embodiment of the present disclosure.

FIG. 8 is a diagram for illustrating a method for evaluating the human driver gaze validity in an unexpected TD situation according to an embodiment of the present disclosure.

Referring to FIG. 8, the device 300 may set a first valid region 801 having a radius d1 around a point 810 where an unexpected TD situation occurs.

The device 300 may set a second valid region 802 to have a maximum radius d2 around the point 810 where the unexpected TD situation has occurred.

In one example, the first valid region 801 may be circular, and the second valid region 802 may be elliptic. This is only one example. The shapes of the first and second valid regions may vary according to a design of a person skilled in the art.

In an embodiment, the first valid region 801 may be located inside the second valid region 802.

In one example, the first valid region 801 and/or the second valid region 802 may be set to be non-symmetrical in a left-right direction. A size and/or a shape of the first valid region 801 and/or the second valid region 802 may vary according to a vehicle driving environment or weather.

In one example, when a road on which the vehicle is currently driving is a congested road in downtown, a size of the first valid region 801 and/or the second valid region 802 may be set to be smaller than that when the road on which the vehicle is currently driving is a suburban non-congested road.

In an example, a size of the first valid region 801 and/or the second valid region 802 when the weather is bad due to fog, snow, rain, etc. may be set to be smaller than that when the weather is clear.

The device 300 may determine the human driver gaze quality value Q as 1 when the human driver gaze point is located in the first valid region 801, as shown in a reference numeral 820. As shown in a reference numeral 840, when the human driver gaze point located outside the second valid region 802, Q may be determined as 0. As shown in a reference numeral 830, when the human driver gaze point is located in a region between the first valid region 801 and the second valid region 802, Q may be determined as a value between 0 and 1.

The steps of the method or the algorithm described in connection with the embodiments disclosed herein may be embodied directly in a hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

The exemplary storage medium is coupled to the processor which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The present disclosure has an advantage of providing the autonomous driving control method and device.

Further, the present disclosure has an advantage of providing the autonomous driving control method and device capable of determining human driver gaze validity when a control-right handover situation occurs during autonomous driving and more safely performing the control-right handover from a system to a human driver based on the determination result.

Further, the present disclosure has an advantage of providing the autonomous driving control method and device capable of determining an optimal driving control scheme based on human driver gaze validity and human driver intervention validity related to each control-right handover event type.

Further, the present disclosure has an advantage of providing the autonomous driving control method and device capable of more accurately and safely determining whether to perform control-right handover and a scheme to perform the handover in a SAE (Society of Automotive Engineers) level 3 autonomous vehicle.

In addition, various effects that may be directly or indirectly identified based on the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling an autonomous driving in a vehicle, the method comprising:
   detecting a situation in which the autonomous driving is impossible while the vehicle operates in an autonomous driving mode;
   outputting a control-right handover request warning alarm and then activating a minimal risk maneuver driving mode;
   determining a human driver gaze validity based on the detected situation in which the autonomous driving is impossible;
   determining a human driver intervention validity when a human driver gaze is determined to be valid; and
   determining a control-right handover of the vehicle based on the human driver intervention validity,
   wherein the determining of the human driver gaze validity includes:
      performing a human driver face recognition using a camera disposed on the vehicle;
      identifying a human driver gaze point based on the human driver facial recognition;
      calculating a human driver gaze quality value (Q) based on the human driver gaze point and the detected situation in which the autonomous driving is impossible; and
      evaluating the human driver gaze validity based on the Q,
      wherein Q is a maximum value or a minimum value or a value higher than the minimum value and below the maximum value.

2. The method of claim 1, wherein the method comprises:
   when the Q is the minimum value, maintaining the minimal risk maneuver driving mode to perform lane-keeping and deceleration driving, regardless of whether or not a human driver intervention is detected.

3. The method of claim 2, wherein the method comprises:
   when the Q is the maximum value, and the human driver is holding a steering wheel, deactivating the outputting of the warning alarm; and
   transferring a full control-right from an autonomous driving system to a human driver to activate a full manual driving mode.

4. The method of claim 3, wherein the method comprises:
   when the Q is the maximum value, and the human driver is performing front-rear direction movement control while the human driver is not holding the steering wheel, transferring front-rear direction movement control-right from the autonomous driving system to the human driver while left-right direction movement control-right belongs to the autonomous driving system.

5. The method of claim 3, wherein the method comprises:
   when the Q is higher than the minimum value and lower than the maximum value, and when a steering wheel torque exceeds a threshold, activating the full manual driving mode; and
   dynamically setting a threshold to have an inversely proportional relationship to the Q.

6. The method of claim 3, wherein when the Q is higher than the minimum value and lower than the maximum value, and when a deceleration resulting from the human driver is greater than a deceleration corresponding to the minimal risk maneuver driving mode while the human driver is not holding the steering wheel, transferring front-rear direction movement control-right from the autonomous driving system to the human driver while left-right direction movement control-right belongs to the autonomous driving system.

7. The method of claim 6, wherein when the Q is higher than the minimum value and lower than the maximum value, and when the deceleration resulting from the human driver is less than or equal to the deceleration corresponding to the minimal risk maneuver driving mode while the human driver is not holding the steering wheel, maintaining the minimal risk maneuver driving mode to perform lane-keeping and deceleration driving.

8. The method of claim 1, wherein the method comprises:
   when the human driver is in a front gaze state at a section termination event, or when a human driver gaze direction is valid for a curved road section in a curved road section drive event, determining that the Q is the maximum value; and
   when the human driver is not in a front gaze state at the section termination event, or when a human driver gaze direction is invalid for the curved road section in the curved road section drive event, determining that the Q is the minimum value,
   wherein the detected situation is an expected transition demand (TD) event including the section termination event and the curved road section drive event.

9. The method of claim 1, wherein the method comprises:
   when the detected situation is an unexpected TD event, determining the Q based on a distance between a point that has caused the unexpected TD situation and the human driver gaze point.

10. A device for controlling an autonomous driving, the device comprising:
    a recognizer configured to detect a situation in which the autonomous driving is impossible in an autonomous driving mode;
    a controller configured to:
       output a control-right handover request warning alarm; and
       activate a minimal risk maneuver driving mode when the situation is detected;
    a human driver gaze validity determiner configured to determine a human driver gaze validity based on the detected situation;

a human driver intervention validity determiner configured to determine a human driver intervention validity when the human driver gaze is determined to be valid;

a control-right handover determiner configured to determine control-right handover based on the human driver intervention validity and a human driver face recognition system configured to perform a human driver face recognition in association with an indoor camera, wherein the human driver gaze validity determiner is configured to:

identify a human driver gaze point based on the human driver facial recognition;

calculate a human driver gaze quality value (Q) based on the human driver gaze point and the detected situation; and evaluate the human driver gaze validity based on the Q, wherein Q is a maximum value or a minimum value or a value higher than the minimum value and below the maximum value.

11. The device of claim 10, wherein when the Q is the minimum value, the control-right handover determiner is configured to maintain the minimal risk maneuver driving mode to perform lane-keeping and deceleration driving, regardless of whether or not a human driver intervention is detected.

12. The device of claim 10, wherein when the Q is the minimum value, the control-right handover determiner is configured to maintain the minimal risk maneuver driving mode to perform lane-keeping and deceleration driving, regardless of whether or not the human driver intervention is detected.

13. The device of claim 10, wherein when the Q is the maximum value, and when the human driver is performing front-rear direction movement control while the human driver is not holding a steering wheel, the control-right handover determiner is configured to transfer front-rear direction movement control-right from an autonomous driving system to the human driver while left-right direction movement control-right belongs to the autonomous driving system.

14. The device of claim 10, wherein when the Q is higher than the minimum value and lower than the maximum value and when a steering wheel torque exceeds a threshold, the control-right handover determiner is configured to:

activate a full manual driving mode; and set a threshold dynamically to have an inversely proportional relationship to the Q.

15. The device of claim 10, wherein when the Q is higher than the minimum value and lower than the maximum value and when a deceleration resulting from the human driver is greater than a deceleration corresponding to the minimal risk maneuver driving mode while the human driver is not holding a steering wheel, the control-right handover determiner is configured to transfer front-rear direction movement control-right from an autonomous driving system to the human driver while left-right direction movement control-right belongs to the autonomous driving system.

16. The device of claim 10, wherein when the Q is higher than the minimum value and lower than the maximum value and when the deceleration resulting from the human driver is less than or equal to the deceleration corresponding to the minimal risk maneuver driving mode while the human driver is not holding a steering wheel, the control-right handover determiner is configured to maintain the minimal risk maneuver driving mode to perform lane-keeping and deceleration driving.

17. The device of claim 10, wherein the control-right handover determiner is configured to:

determine that the Q is the maximum value when the human driver is in a front gaze state at a section termination event, or when a human driver gaze direction is valid for a curved road section in a curved road section drive event; and determine that the Q is the minimum value when the human driver is not in a front gaze state at the section termination event, or when a human driver gaze direction is invalid for the curved road section in the curved road section drive event, wherein the detected situation is an expected transition demand (TD) event including the section termination event and the curved road section drive event.

18. The device of claim 10, wherein the control-right handover determiner is configured to:

determine the Q based on a distance between a point that has caused the unexpected TD situation and the human driver gaze point when the detected situation is the unexpected TD event.

* * * * *